(12) United States Patent
Zhang et al.

(10) Patent No.: US 10,312,670 B2
(45) Date of Patent: Jun. 4, 2019

(54) DRIVE DEVICE FOR VACUUM CIRCUIT BREAKER CHASSIS

(71) Applicant: ABB Schweiz AG, Baden (CH)

(72) Inventors: Xin Zhang, Xiamen (CN); Zhian Wang, Xiamen (CN); Zhijian Zhuang, Xiamen (CN)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/656,833

(22) Filed: Jul. 21, 2017

(65) Prior Publication Data

US 2018/0183220 A1 Jun. 28, 2018

(30) Foreign Application Priority Data

Dec. 23, 2016 (CN) ..................... 2016 2 1424598 U

(51) Int. Cl.
*H02B 11/133* (2006.01)
*H01H 33/66* (2006.01)
(Continued)

(52) U.S. Cl.
CPC ....... *H02B 11/133* (2013.01); *F16H 25/2454* (2013.01); *H01H 33/66* (2013.01);
(Continued)

(58) Field of Classification Search
CPC ...... H01H 33/66; H01H 33/666; H01H 71/10; H01H 9/22; H02B 11/133; H02B 11/127;
(Continued)

(56) References Cited

U.S. PATENT DOCUMENTS 4,763,219 A * 8/1988 Nakamura ........... H01H 35/006
361/23
4,857,783 A * 8/1989 Prunkard ............... H02K 29/06
310/68 B
(Continued)

FOREIGN PATENT DOCUMENTS

CN 203312685 * 11/2013 ........... H02B 11/167
WO WO2013143415 A1 * 10/2013 ........... H02B 11/167

OTHER PUBLICATIONS

Translation CN203312685 (Original document filed Nov. 27, 2013).*
Translation of WO2013143415 (Original doc. published Oct. 3, 2013) (Year: 2013).*

*Primary Examiner* — Edwin A. Leon
*Assistant Examiner* — William A Bolton
(74) *Attorney, Agent, or Firm* — Taft Stettinius & Hollister LLP; J. Bruce Schelkopf

(57) ABSTRACT

The present invention provides a drive device for a middle-high voltage vacuum circuit breaker chassis, which comprises a drive motor (10), a clutch (11) and a drive chain wheel (12); the clutch (11) is installed on an output shaft of the drive motor (10), the drive chain wheel (12) is directly fixed with the clutch (11), and the drive chain wheel (12) is driven by the drive motor (10) through the clutch (11). The drive device further comprises a driven chain wheel (13) and a chain (14) or a belt, the driven chain wheel (13) is fitted over a lead screw (15) of the chassis; and the driven chain wheel (13) is driven by the drive chain wheel (12) through the chain (14) so as to drive the lead screw (15) to rotate together. The drive device further comprises a position locking device (39), which is insertable into a recess (37*a-c*) on the lead screw (15) to lock the chassis.

19 Claims, 8 Drawing Sheets

(51) Int. Cl.
*F16H 25/24* (2006.01)
*F16H 25/20* (2006.01)

(52) U.S. Cl.
CPC ............... *F16H 2025/2071* (2013.01); *F16H 2025/2096* (2013.01)

(58) Field of Classification Search
CPC . H02B 11/173; H02B 11/167; F16H 25/2454; F16D 43/06
USPC ........ 361/605, 608, 612, 618, 619; 218/118; 200/50.21
See application file for complete search history.

(56) References Cited

U.S. PATENT DOCUMENTS

| | | | | |
|---|---|---|---|---|
| 8,304,672 B2* | 11/2012 | Lee | ...................... | H02B 11/127 200/50.25 |
| 8,395,064 B2* | 3/2013 | Kim | ...................... | H02B 11/133 200/50.21 |
| 8,410,389 B2* | 4/2013 | Trussler | ................... | H01H 3/26 218/154 |
| 8,420,964 B2* | 4/2013 | Pearce | ................. | H02B 11/127 200/50.25 |
| 8,476,993 B1* | 7/2013 | Schilke | ................. | H01H 3/227 335/68 |
| 9,843,173 B2* | 12/2017 | Farina | ..................... | H02B 11/10 |
| 2015/0114807 A1* | 4/2015 | Benke | ................... | H02B 11/167 200/50.23 |

* cited by examiner

DRIVE DEVICE FOR VACUUM CIRCUIT BREAKER CHASSIS

TECHNICAL FIELD

The present invention relates to the field of electrical technologies, particularly relates to the field of middle-high voltage vacuum circuit breaker technologies, and especially relates to the drive technologies of a middle-high voltage vacuum circuit breaker chassis.

BACKGROUND

FIG. 1 is a drive device of a middle-high voltage vacuum circuit breaker chassis widely used at present. The device has a three-level transmission chain, and comprises a drive motor 27, a worm and worm wheel 20, a clutch 21, a first chain wheel 22, a second chain wheel 23, a chain 24, a first gear 25, and a second gear 26. The worm and worm wheel 20 is installed on an output shaft of the drive motor, and one side of the clutch 21 is fixed with a worm wheel; and the first chain wheel 22 is fixed with the other side of the clutch 21. The first chain wheel 22 is connected to the second chain wheel 23 through the chain 24, the second chain wheel 23 is fixed with the first gear 25; the first gear 25 is meshed with the second gear 26, and the second gear 26 is fitted over a lead screw so as to drive the lead screw to rotate together.

The first-level transmission chain is that: the drive motor 27 firstly drives the first chain wheel 22 through the worm and worm wheel 20 and the clutch 21. The second-level transmission chain is that: the second chain wheel 23 is driven by the first chain wheel 22 through the chain 24, and the second chain wheel 23 is fixed with the first gear 25 so as to drive the first gear 25 to rotate together. The third-level transmission chain is that: the first gear 25 is meshed with the second gear 26, and the second gear 26 is fitted over the lead screw so as to drive the lead screw to rotate together.

In this design, the drive motor drives the lead screw of the chassis to enable the chassis to rotate together, through a three-level transmission. However, this design has a complicated structure which is tedious to manufacture and install, and also increases the product cost. Moreover, the circuit breaker models to which the complicated structure is applicable is also limited, due to the vertical arrangement of the drive motor.

SUMMARY

The present invention provides a drive device for a middle-high voltage vacuum circuit breaker chassis. The drive device comprises a drive motor, a clutch, and a drive chain wheel. The clutch is installed on an output shaft of the drive motor, the drive chain wheel is directly fixed with the clutch, and the drive chain wheel is driven by the drive motor through the clutch. The drive device further comprises a driven chain wheel which is fitted over a lead screw of the chassis, and the driven chain wheel is driven by the drive chain wheel so as to drive the lead screw to rotate together.

According to a preferred embodiment of the present invention, the driven chain wheel is driven by the drive chain heel through a chain.

According to a preferred embodiment of the present invention, the driven chain wheel is driven by the drive chain wheel through a belt.

According to a preferred embodiment of the present invention, the drive motor and the lead screw of the chassis are arranged on the same plane.

According to a preferred embodiment of the present invention, a permanent magnetic direct current motor is adopted as the drive motor.

According to another preferred embodiment of the present invention, a brushless direct current motor integrated with a logic control unit is adopted as the drive motor.

According to a preferred embodiment of the present invention, the drive device further comprises a position locking device, which is insertable into the recess on the lead screw to lock the chassis.

According to a preferred embodiment of the present invention, the drive device further comprises a drive control microswitch, which is configured to shut off the drive motor when the position locking device is in locking position.

According to a preferred embodiment of the present invention, the drive device further comprises a working position control microswitch and an isolation position control microswitch.

According to a preferred embodiment of the present invention, when the chassis moves forwards to the working position, the working position control microswitch is actuated by the pressing plate, indicating that the chassis arrives at the working position; meanwhile, the swinging in circuit of the drive motor is shut off, so that the chassis would not be swung in by the drive motor even if the drive motor receives a signal for swinging in chassis, so as to avoid an operation by mistake.

According to a preferred embodiment of the present invention, when the chassis is swung out of the isolation position, the isolation position control microswitch is actuated by a pressing block, indicating that the chassis arrives at the isolation position; meanwhile, the motor circuit that enables the chassis to swing out of the isolation position is shut off, so that the chassis would not be swung out by the drive motor even if the drive motor receives a signal for swinging out the chassis.

According to a preferred embodiment of the present invention, the drive device further comprise an electromagnet, which is configured so that once the circuit for unlocking electromagnet is closed, the movement of the iron core of the electromagnet makes the position locking device move away from the recess on the lead screw, and meanwhile makes the pressing plate move and actuate the working position control microswitch for the motor circuit to be closed.

The drive device of a middle-high voltage vacuum circuit breaker chassis according to the present invention is simple in design, has fewer components, is convenient to install, and has a lower cost.

BRIEF DESCRIPTIONS OF THE FIGURES

DETAILED DESCRIPTION

The structure and working principle of a drive device for a middle-high voltage vacuum circuit breaker chassis according to the present invention will be described in details hereinafter with reference to the figures.

Figure 2:
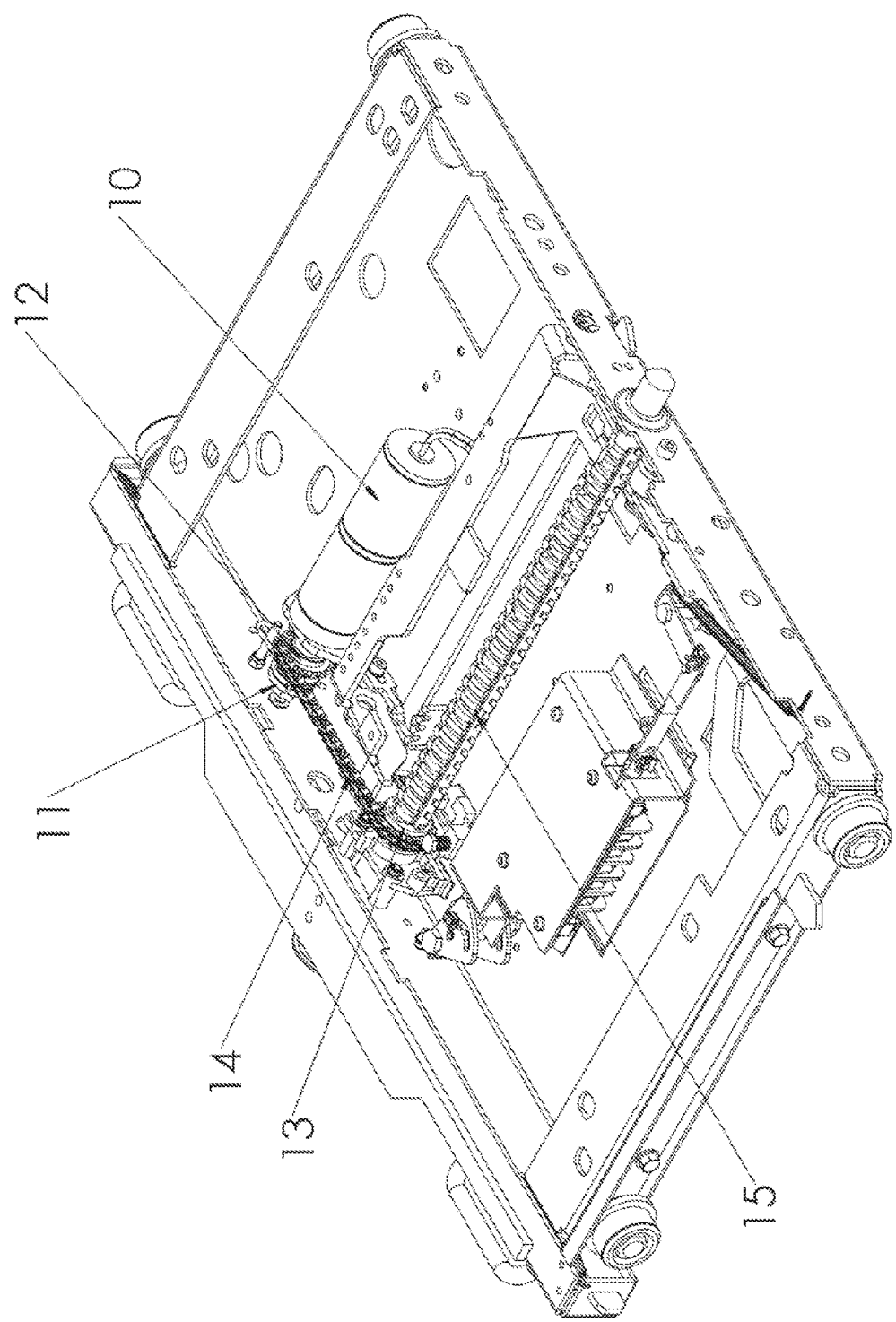
FIG. 2 is a structure diagram of a drive device according to a preferred embodiment of the present invention.
Figure 3:
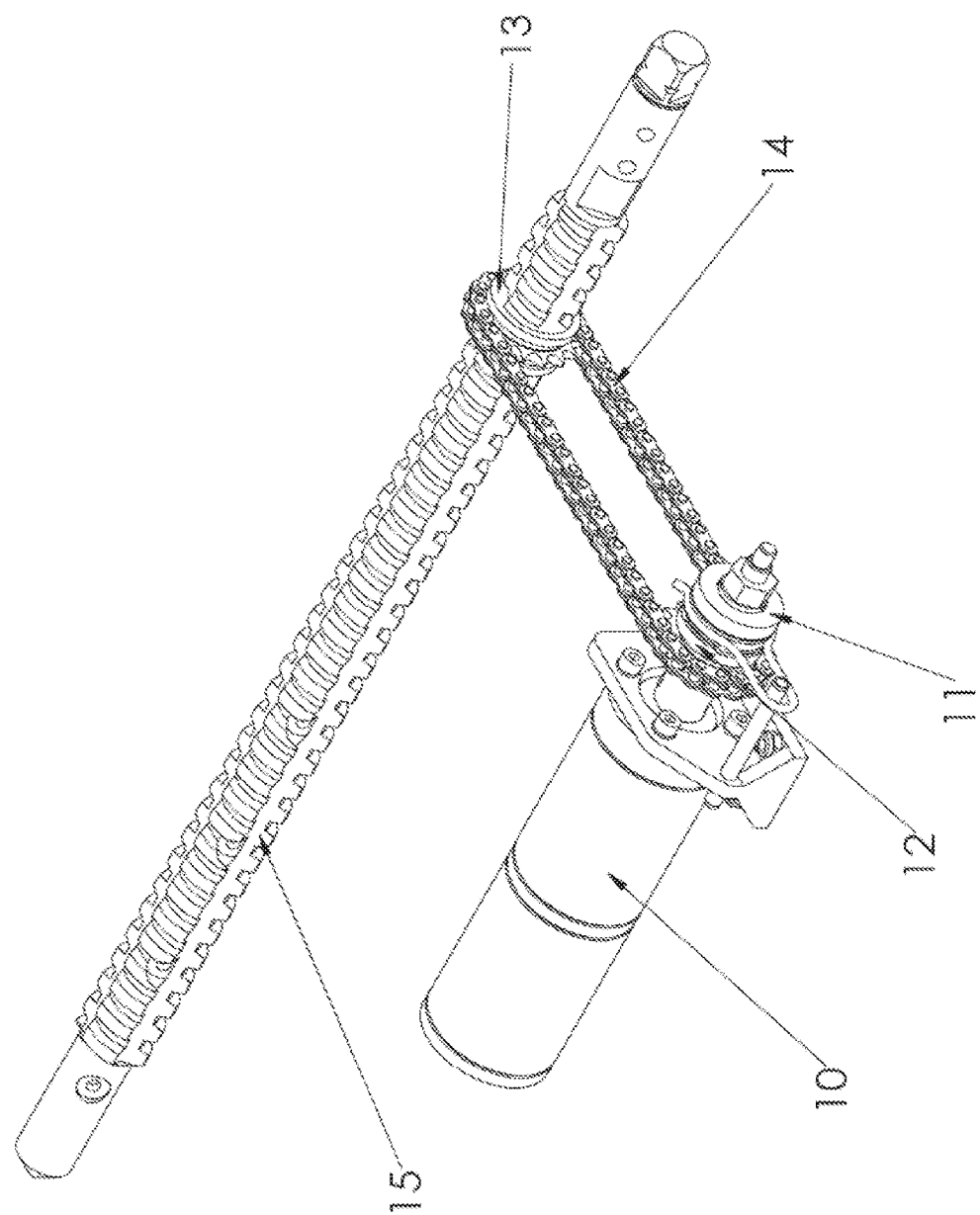
FIG. 3 is a schematic diagram of a drive device according to the present invention without a chassis.

FIG. 2 is a structure diagram of a drive device according to a preferred embodiment of the present invention; and FIG. 3 is a schematic diagram of a drive device according to the present invention without a chassis. Compared with the drive device in the prior an, the drive device for a middle-high voltage vacuum circuit breaker chassis according to the present invention only has one-level transmission chain; it comprises a drive motor 10, a clutch 11, a drive chain wheel 12, a driven chain wheel 13, a chain 14 and a lead screw 15. The clutch 11 is installed on an output shaft of the drive motor 10; the drive chain wheel 12 is fixed with the clutch 11; the drive chain wheel 12 is connected to the driven chain wheel 13 through the chain 14; and the driven chain wheel 13 is fitted over the lead screw so as to drive the lead screw 15 to rotate together.

Under a power-driven operation mode, the drive chain wheel 12 is driven to rotate by the drive motor 10 through the clutch 11, and the driven chain wheel 13 fitted over the lead screw 15 is driven to rotate by the drive chain wheel 12 through the chain 14, so as to make the lead screw 15 rotate to drive the chassis to go forwards or backwards.

According to a preferred embodiment of the present invention, when the chassis is used for a smaller circuit breaker, the chain can be replaced by a belt. Compared with the chain, the advantage of using the belt is that if there is any problem on the logic control of the motor, the belt may break off, so that the motor or the circuit breaker will not be damaged. However, when a chain is used, the motor or the circuit breaker will be easily damaged since the chain is relatively hard and cannot break off.

According to a preferred embodiment of the present invention, a brushless direct current motor integrated with a logic control unit, as well as a permanent magnetic direct current motor, may also be directly used as the drive motor. Since the brushless direct current motor has the logic control unit itself, a special motor controller is not needed, so that the cost is lower. A logic control table is shown as follows:

| | | Telesignalization status | | | |
|---|---|---|---|---|---|
| Operation status | | Work location | Test location | Switch-on location | Switch-off location |
| Enable to pull in the handcart | | 0 | x | 0 | 1 |
| Stop pulling in the handcart | To "work location" | 1 | x | x | x |
| | The "switch-off location" is disabled | x | x | x | 0 |
| Enable to pull out the handcart | | x | 0 | 0 | 1 |
| Stop pulling out the handcart | to "test location" | x | 1 | x | x |
| | The "switch-off location" is disabled | x | x | x | 0 |

The same function as that of the existing drive device can be implemented through the drive device for a middle-high voltage vacuum circuit breaker chassis according to the present invention with one-level transmission chain only. Therefore, the drive device is simple in design, has fewer components, is convenient to install, and has a lower cost.

Figure 4A:
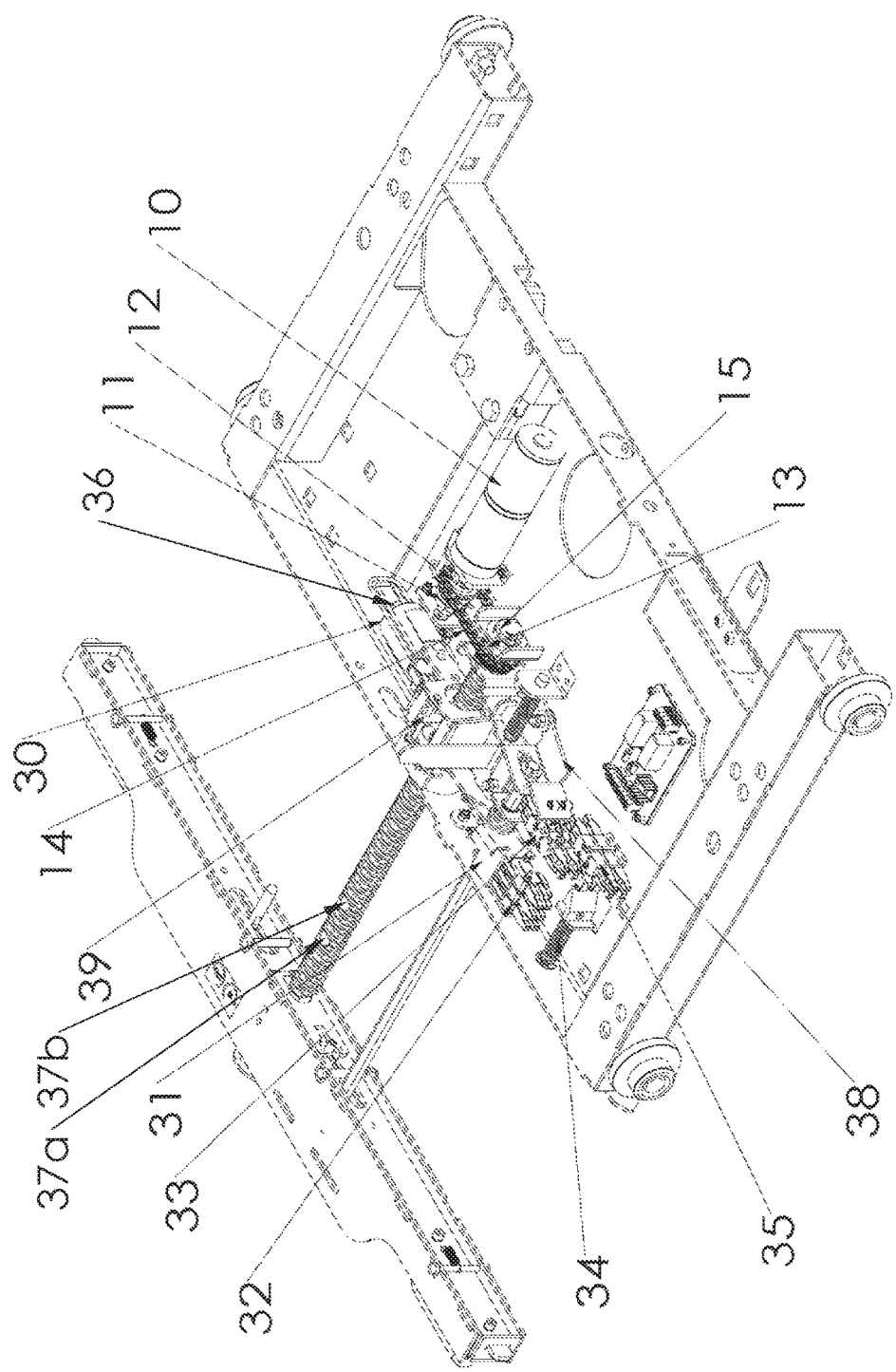
FIG. 4D is a cross sectional view of a portion of the structure diagram depicted in FIG. 4A.
FIG. 4E is an enlarged view of the bounded area labeled 4E in FIG. 4C.
Figure 4B:
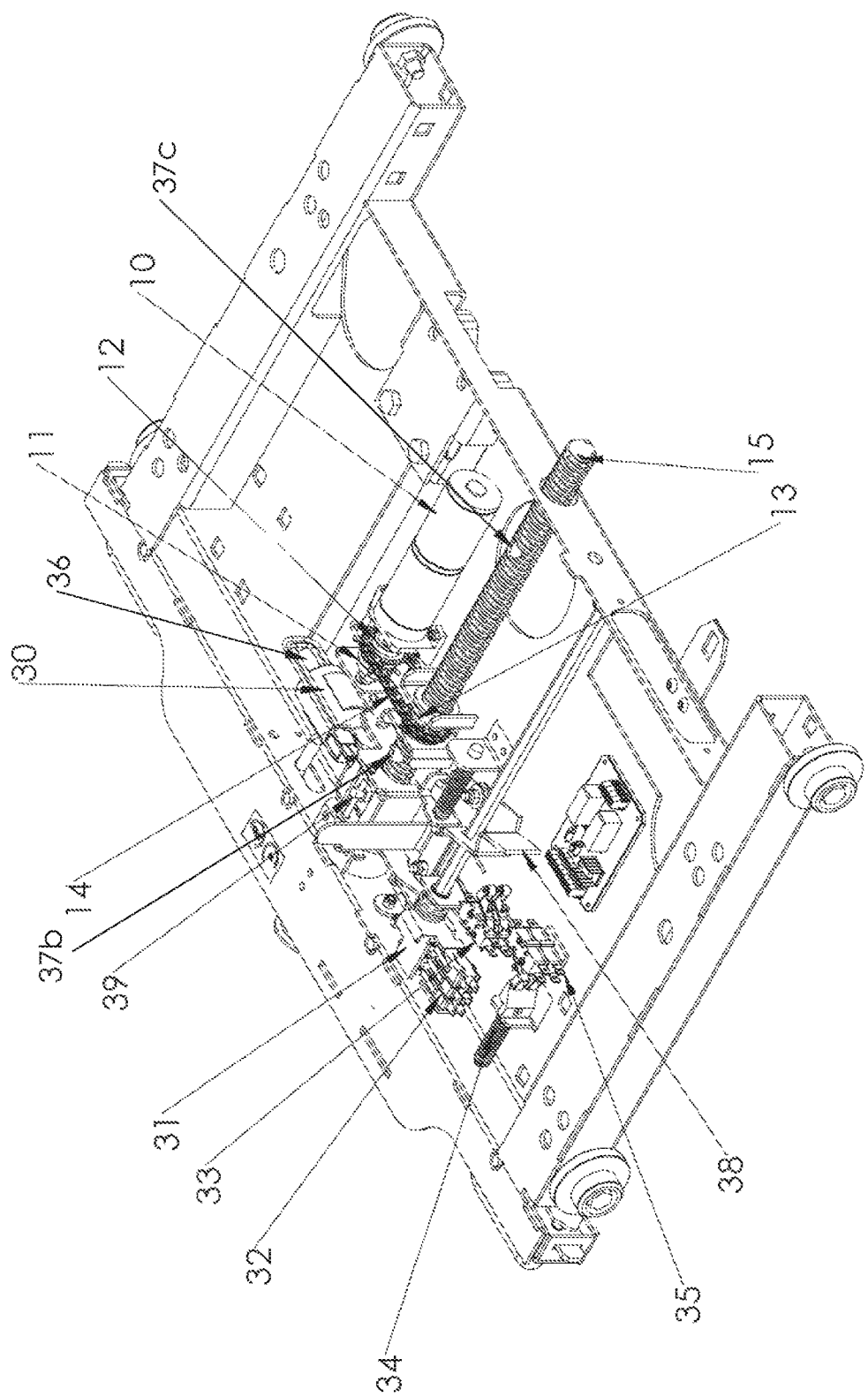
Figure 4C:
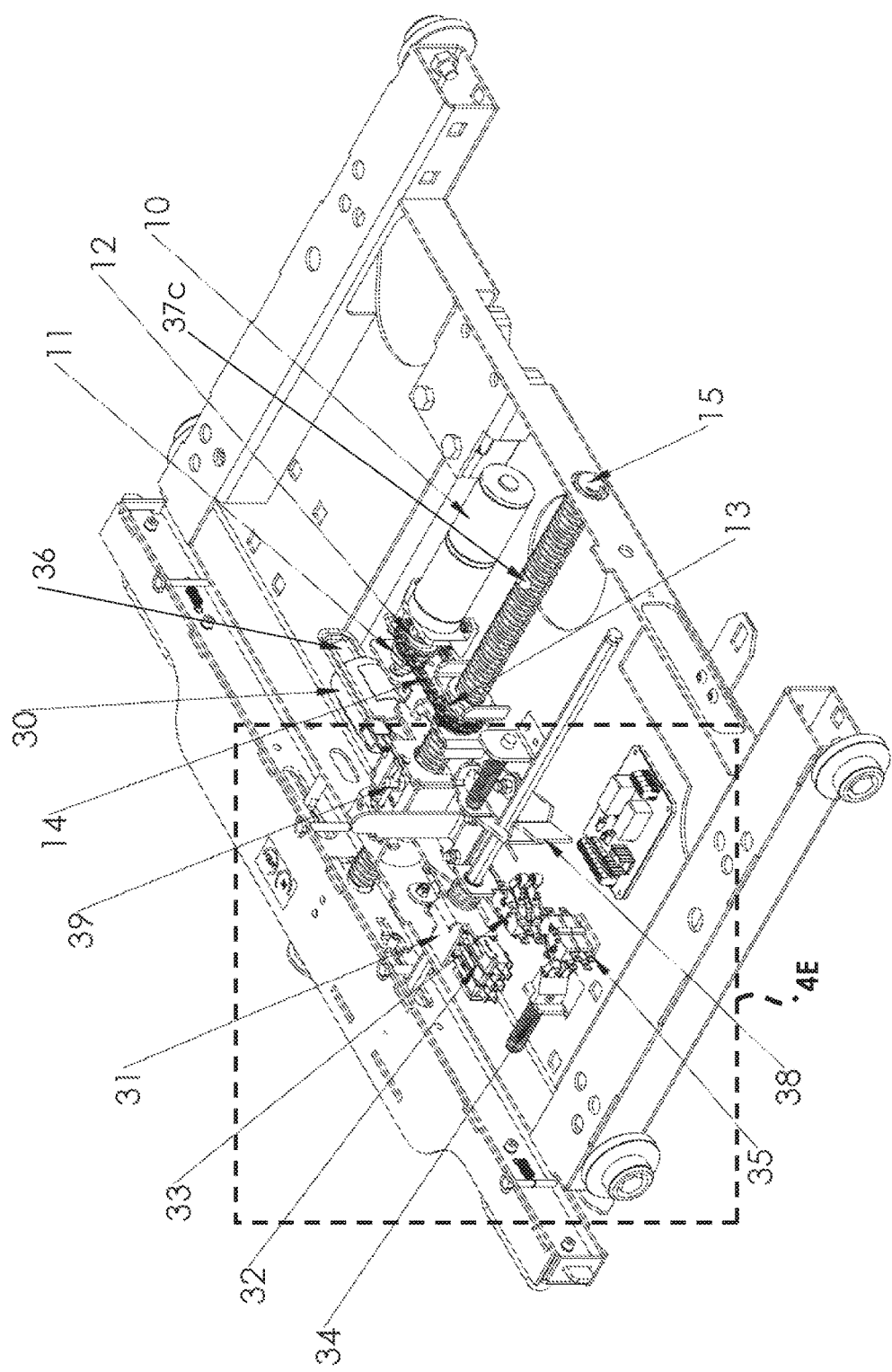
Figure 4D:
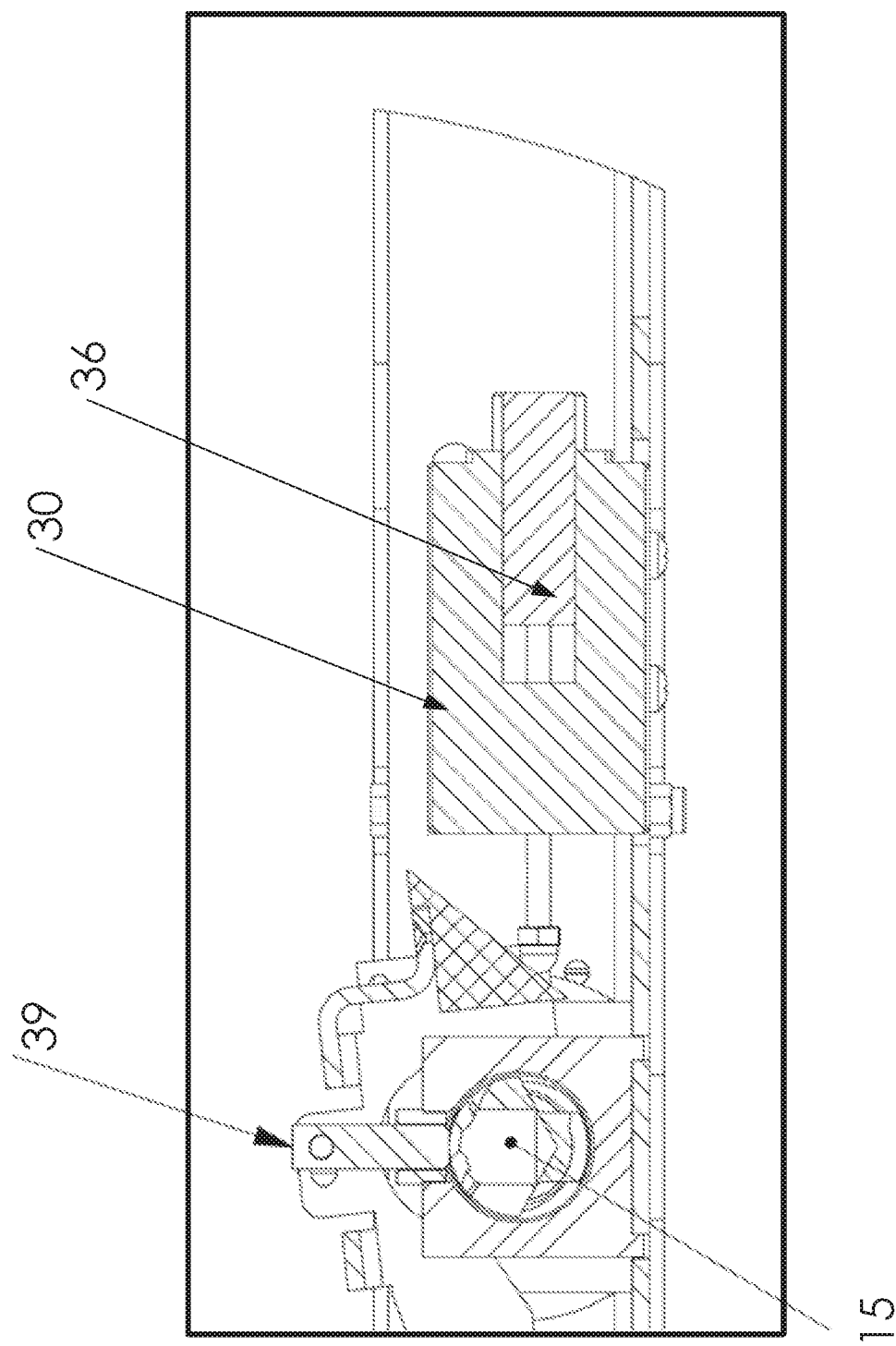
Figure 4E:
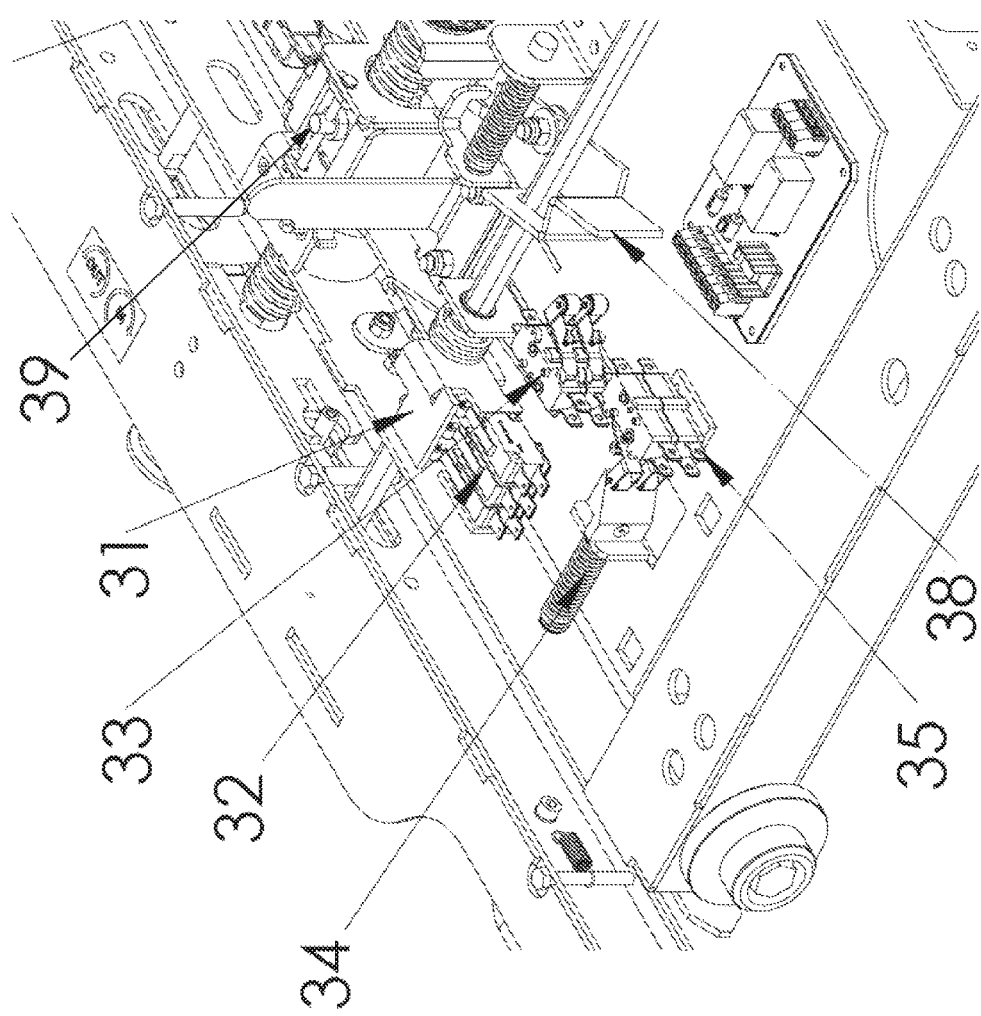

FIGS. 4A-4C is a structure diagram of a drive device according to a prefer embodiment of the present invention. FIG. 4A shows a chassis in a working position. FIG. 4B shows a chassis in an isolation position, and FIG. 4C shows a chassis in a test position. According to the prefer embodiment of the present invention, as seen in FIGS. 4A-4E, a drive and control interlock device of a middle-high voltage circuit breaker chassis comprises a drive motor 10, a clutch 11, a drive chain wheel 12, a position locking device 39, an unlocking electromagnet 30, a drive control microswitch 32, a working position control microswitch 33, and an isolation position control microswitch 35. Clutch 11 is mounted on an output shaft of the drive motor 10, and the drive chain wheel 12 is directly fixed with the clutch 1 the drive motor 10 drives the drive chain wheel 12 via clutch 11.

When the position locking device 39 is inserted into a recess 37a, 37b, 37c of the lead screw 15, the chassis is locked and the drive control microswitch 32 for the motor circuit is in an open state, and the chassis is unable to be driven no matter by manual or by electricity power. Once the circuit for unlocking electromagnet 30 is closed, the movement of the iron core 36 of the electromagnet 30, such as, for example, movement from a position shown in FIGS. 4B and 4C to a position shown in FIGS. 4A and 4D, makes the position locking device 39 move away from the recess 37a, 37b, 37c on the lead screw 15 (see e.g., FIG. 4D), meanwhile a pressing plate in linkage moves and actuates the working position control microswitch 33 for the motor circuit to be closed, the motor circuit is closed, and the drive motor 10 drives the drive chain wheel 12 via the clutch 11, as well as the driven chain wheel 13, and the chain 14 or a belt. The driven chain wheel 13 is sleeved on the lead screw 15; the drive chain wheel 12 drives the driven chain wheel 13 via the chain 14, to bring the lead screw 15 to rotate together.

The position locking device 39 slides along the surface of the lead screw 15, and when it arrives at a followed recess 37a, 37b, 37c on the lead screw 15, the position locking device 39 falls into the recess 37a, 37b, 37c under the action of a spring and the weight of itself, locking the chassis into its present position. Meanwhile, the pressing plate 31 in linkage actuates the working position control microswitch 33 for the motor circuit to shut off the motor circuit, and the drive motor is stopped to rotate.

When the chassis moves forwards to the working position, the working position control microswitch 33 is actuated by the pressing plate 38, indicating that the chassis arrives at the working position, meanwhile, the swinging in circuit of the drive motor 10 is shut off, so that the drive motor 10 would not swing in the chassis even if the drive motor receives a signal for swinging in chassis, so as to avoid misoperation.

When the chassis is swung out of the isolation position, the isolation position control microswitch 35 is actuated by a pressing block 34, indicating that the chassis arrives at the isolation position; meanwhile, the swinging out circuit of the drive motor 10 is shut off, so that the drive motor would not swing out the chassis even if the drive motor receives a signal for swinging out the chassis, so as to avoid misoperation.

Figure 1:
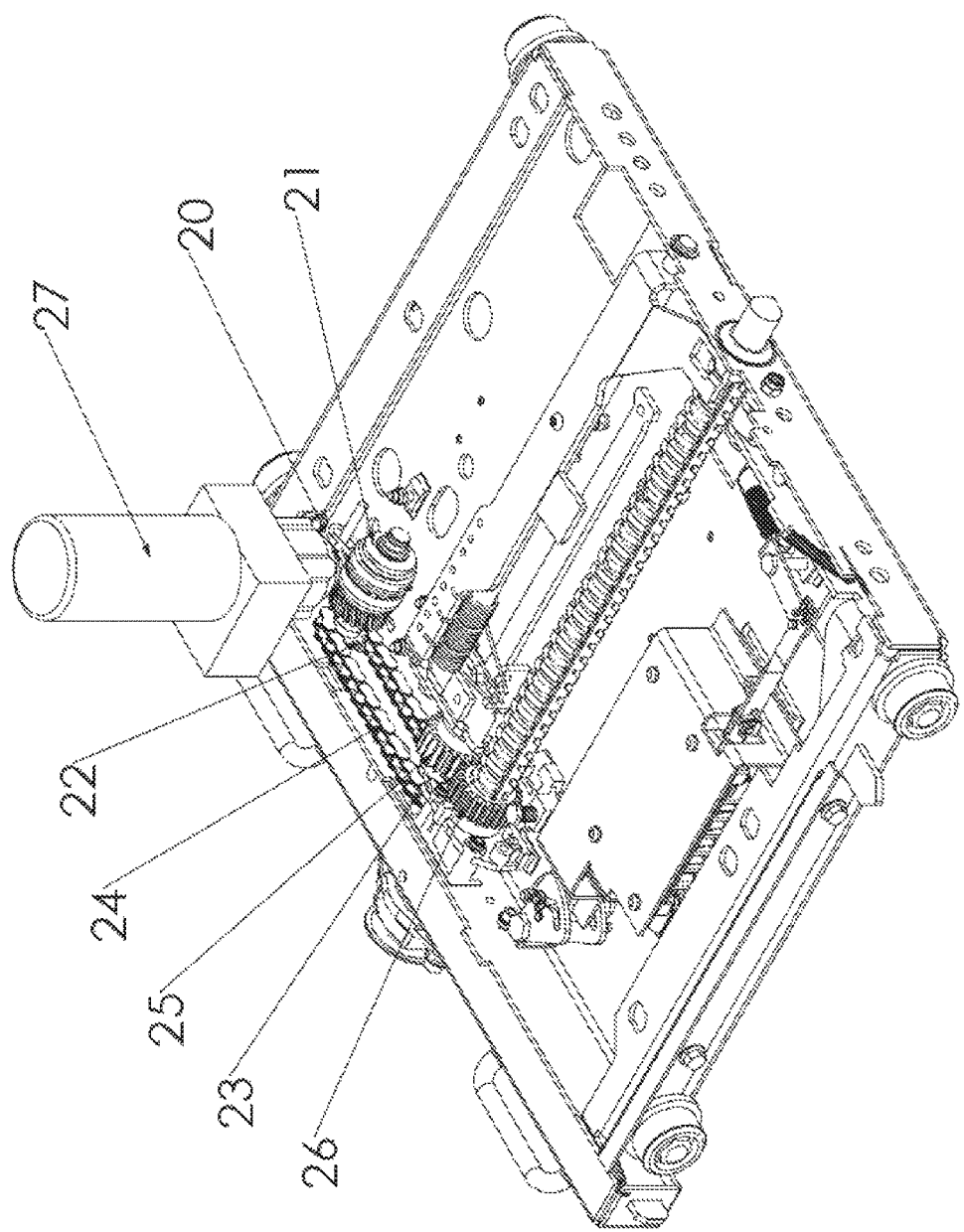
FIG. 1 is a schematic diagram of a drive device of a middle-high voltage vacuum circuit breaker chassis widely used at present.

As shown in FIG. 1, a vertically outstanding drive motor 27 which may interfere with the circuit breaker is arranged in the drive device for a middle-high voltage vacuum circuit breaker chassis of the prior art. Therefore, such a chassis can be only used in some circuit breakers. As shown in FIG. 2, the drive motor 10 and the lead screw 15 of the chassis are arranged on the same plane or parallel planes (relative to the vertical arrangement of the prior art) according to the drive device for a middle-high voltage vacuum circuit breaker chassis in the present invention, and vertical arrangement is not adopted, so that no interference from the circuit breaker is involved. Therefore, such a chassis can be applicable to all circuit breakers.

Although the preferred embodiments and figures of the present invention are disclosed for illustration purpose, those skilled in the art can make various replacements, changes and polishing without departing from the spirit and scope of the present invention and the claims appended. Therefore, the present invention shall not be limited to the contents disclosed in the preferred embodiment and figures. The protection scope of the present invention is subject to the scope defined by the claims appended.

The invention claimed is:

1. A drive device for a middle-high voltage vacuum circuit breaker chassis, comprising:
    a drive motor, a clutch, and a drive chain wheel, the clutch being coupled to an output shaft of the drive motor, the drive chain wheel being coupled to the clutch;
    a driven chain wheel positioned on a lead screw of a chassis;
    a drive means directly coupled to the drive chain wheel and the driven chain wheel such that rotation of the drive chain wheel is transmitted by the drive means to the driven chain wheel, wherein the driven chain wheel and the lead screw rotate together; and
    a position locking device that is insertable into a recess on the lead screw to lock the chassis.

2. The device drive for the middle-high voltage vacuum circuit breaker chassis according to claim 1, wherein the drive means comprises a chain or a belt.

3. A drive device for a middle-high voltage vacuum circuit breaker chassis, comprising:
    a drive motor, wherein the drive device further comprises a clutch and a drive chain wheel; the clutch is installed on an output shaft of the drive motor, the drive chain wheel is directly fixed with the clutch, and the drive chain wheel is driven by the drive motor through the clutch; the drive device further comprises a driven chain wheel which is fitted over a lead screw of a chassis, and the driven chain wheel is driven by the drive chain wheel so as to drive the lead screw to rotate together; and wherein the drive device further comprises a position locking device, which is insertable into a recess on the lead screw to lock the chassis.

4. The drive device for the middle-high voltage vacuum circuit breaker chassis according to claim 3, wherein the driven chain wheel is driven by the drive chain wheel through a chain.

5. The drive device for the middle-high voltage vacuum circuit breaker chassis according to claim 4, wherein the drive motor and the lead screw of the chassis are arranged on a plane, the plane being the same for the drive motor and the lead screw.

6. The drive device for the middle-high voltage vacuum circuit breaker chassis according to claim 5, wherein a brushless direct current motor integrated with a logic control unit is adopted as the drive motor.

7. The device drive for the middle-high voltage vacuum circuit breaker chassis according to claim 5, wherein a permanent magnet direct current motor is adopted as the drive motor.

8. The drive device for the middle-high voltage vacuum circuit breaker chassis according to claim 3, wherein the driven chain wheel is driven by the drive chain wheel through a belt.

9. The drive device for the middle-high voltage vacuum circuit breaker chassis according to claim 8, wherein the drive motor and the lead screw of the chassis are arranged on a plane, the plane being the same for the drive motor and the lead screw.

10. The drive device for the middle-high voltage vacuum circuit breaker chassis according to claim 9, wherein a brushless direct current motor integrated with a logic control unit is adopted as the drive motor.

11. The device drive for the middle-high voltage vacuum circuit breaker chassis according to claim 9, wherein a permanent magnet direct current motor is adopted as the drive motor.

12. The drive device for the middle-high voltage vacuum circuit breaker chassis according to claim 3, wherein the drive motor and the lead screw of the chassis are arranged on a plane, the plane being the same for the drive motor and the lead screw.

13. The device drive for the middle-high voltage vacuum circuit breaker chassis according to claim 12, wherein a permanent magnet direct current motor is adopted as the drive motor.

14. The drive device for the middle-high voltage vacuum circuit breaker chassis according to claim 12, wherein a brushless direct current motor integrated with a logic control unit is adopted as the drive motor.

15. The drive device for the middle-high voltage vacuum circuit breaker chassis according to claim 3, further comprising a drive control microswitch, which is configured to shut off the drive motor when the position locking device is in a locking position.

16. The drive device for the middle-high voltage vacuum circuit breaker chassis according to claim 3, further comprising a working position control microswitch and an isolation position control microswitch.

17. The drive device for the middle-high voltage vacuum circuit breaker chassis according to claim 16, wherein, when the chassis moves forward to a working position, the working position control microswitch is actuated by a pressing plate; meanwhile, a swinging in circuit of the drive motor is shut off, so that the drive motor would not swing in the chassis even if the drive motor receives a signal for swinging in chassis, so as to avoid misoperation.

18. The drive device for the middle-high voltage vacuum circuit breaker chassis according to claim 16, wherein, when the chassis is swung out of an isolation position, the isolation position control microswitch is actuated by a pressing block; meanwhile, a swinging out circuit of the drive motor is shut off, so that the drive motor would not swing out the chassis even if the drive motor receives a signal for swinging out the chassis, so as to avoid misoperation.

19. A drive device for a middle-high voltage vacuum circuit breaker chassis, comprising:
    a drive motor, wherein the drive device further comprises a clutch and a drive chain wheel; the clutch is installed on an output shaft of the drive motor, the drive chain wheel is directly fixed with the clutch, and the drive chain wheel is driven by the drive motor through the clutch; the drive device further comprises a driven chain wheel which is fitted over a lead screw of a chassis, and the driven chain wheel is driven by the drive chain wheel so as to drive the lead screw to rotate together; and
    wherein the drive device further comprises an electromagnet, which is configured so that once a circuit for unlocking electromagnet is closed, a movement of an iron core of the electromagnet makes a position locking device move away from a recess on the lead screw, and meanwhile makes a pressing plate move and actuate a working position control microswitch for a motor circuit to be closed.

\* \* \* \* \*